(12) United States Patent
Chabot et al.

(10) Patent No.: US 6,327,409 B1
(45) Date of Patent: Dec. 4, 2001

(54) OPTICAL FIBER RIBBON IN WHICH THE END FIBERS ARE PROTECTED FROM STRESS

(75) Inventors: Neil Thomas Chabot, Raleigh; John Rosko, Apex, both of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/479,864

(22) Filed: Jan. 10, 2000

(51) Int. Cl.[7] .................................................. G02B 6/44
(52) U.S. Cl. ........................................... 385/114; 385/102
(58) Field of Search ...................................... 385/100–114

(56) References Cited

U.S. PATENT DOCUMENTS

| | | | |
|---|---|---|---|
| 4,715,677 | 12/1987 | Saito et al. ............................ | 385/114 |
| 4,900,126 | 2/1990 | Jackson et al. ....................... | 385/114 |
| 5,293,443 | 3/1994 | Eoll et al. ............................. | 385/114 |
| 5,457,762 | 10/1995 | Lochkovic et al. ................... | 385/114 |

OTHER PUBLICATIONS

FOTP–3, Procedure to Measure Temperature Cycling Effects on Optical Fibers, Optical Cable, and Other Passive Fiber Optic Components; EIA/TIA—455–3A, American National Standard, ANSI/EIA–TIA–455–3A–1989, Electronic Industries Association Engineering Department, May 1989.

*Primary Examiner*—Phan T. H. Palmer
(74) *Attorney, Agent, or Firm*—Sughrue, Mion, Zinn, Macpeak & Seas, PLLC

(57) ABSTRACT

An optical fiber ribbon cable in which the edge fibers are protected from experience excessive stress from impact of the like during manufacturing, installation and use. The cable includes an optical fiber ribbon having a plurality of optical fibers arranged in parallel including edge fibers respectively located on opposite edges of the ribbon and interior fibers located between the edge fibers; and an optical fiber jacket surrounding the ribbon and defining a first space between said jacket and each of the edge fibers and a second space, contiguous with said first space, between said jacket and the interior fibers. The width of said first space adjacent the edge fibers is greater than a width of said second space adjacent the interior fibers.

14 Claims, 6 Drawing Sheets

OPTICAL FIBER RIBBON IN WHICH THE END FIBERS ARE PROTECTED FROM STRESS

BACKGROUND

1. Field of the Invention

The present invention relates to an improved optical fiber ribbon cable in which the stress experienced by fibers located along the outside edge of the cable is minimized to improve the attenuation of those fibers.

2. Related Art

Referring to FIG. 1, conventional optical fiber ribbon cables 10 includes one or more optical fiber ribbons 12 each including a plurality of optical fibers (usually twelve) 14 disposed in a plane and encapsulated with a polymer containing an ultraviolet curable resin 16. Surrounding the optical fiber ribbon(s) 12 is a plastic jacket 18 with an aramid yarn 20, or the like, located in the space 22 between the ribbon 12 and the jacket 18.

As shown in FIG. 1, the space 22 between the optical fiber ribbon 12 and the jacket 18 is substantially uniform around the periphery of the ribbon. The problem with this conventional design is that the optical fibers on the outside edge ("edge fibers"), identified by reference numeral 24, experience excessive stress during the manufacturing, installation and use of the cable, as compared to the interior fibers, identified by reference numeral 26. Hence, the attenuation of the edge fibers increases, as compared to the neighboring optical fibers. The stresses are magnified at temperature extremes (e.g., -20 degrees C.).

As noted above, the stress to which the fibers may be subjected is generated during the manufacturing process, the installation of the cable and during the static use of the cable. For example, the step of extruding the outerjacket onto the optical fiber ribbon naturally generates stresses in the optical fibers and particularly on the edge fibers 24. One reason for this is that when the outer jacket is extruded, coating is applied in a melted state and then cooled resulting in constriction of the fibers, and particularly the edge fibers. In addition, during the handling of the cable, pressure is inevitably applied to the jacket. However, due to the fact that the edge fibers 24 are on the outside edge of the cable, they are generally subjected to greater stress than the interior fibers 26. When a shock force is applied to the center portion of the cable, it is absorbed by many of the interior fibers such that the pressure (stress) experienced by any one of the interior fibers 26 is relatively small. In contrast, when the same shock is applied to the edge of the cable, a single edge fiber 24 absorbs the shock (i-e., it is not absorbed to by the interior fibers 26) such that the pressure (stress) experienced by the edge fiber is relatively large. These same considerations come into play during use of the cable when an external force is applied.

Finally, when the cable is subjected to a substantial change in temperature, the expansion and contraction of the jacket can damage the fibers and particularly the edge fibers 24.

SUMMARY OF THE INVENTION

An object of the present invention is to provide an optical fiber ribbon cable in which the edge fibers do not experience excessive stresses so that the attenuation is within an acceptable range of the neighboring fibers.

This and other objects are achieved by an optical fiber ribbon cable including an optical fiber ribbon having a plurality of optical fibers arranged in parallel including edge fibers respectively located on opposite edges of the ribbon and interior fibers located between the edge fibers; and an optical fiber jacket surrounding the ribbon and defining a first space between the jacket and each of the edge fibers and a second space, contiguous with the first space, between the jacket and the interior fibers. The width of the first space adjacent the edge fibers is greater than a width of the second space adjacent the interior fibers. The cable further includes a strengthening filler disposed in the first and second spaces.

According to the preferred embodiment, the first and second spaces combine to have a dogbone shape. Alternatively, the width of the second space can gradually increase from a center of the optical fiber ribbon toward the opposite edges in a linear or non-linear matter. Further, the cable can include a plurality of ribbons arranged vertically or horizontally.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE INVENTION

Figure 1:
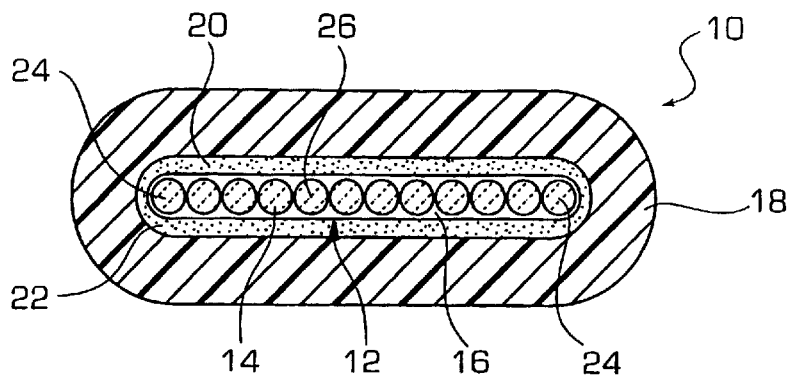
FIG. 1 a schematic cross-section of a conventional optical fiber ribbon cable.

The first embodiment of the invention will now be described with reference to FIG. 2 Throughout the figures, similar reference numerals are used to denote similar elements of the invention. Elements which correspond to like elements of the conventional cable illustrated in FIG. 1 are identified with similar reference numerals as well.

Figure 2:
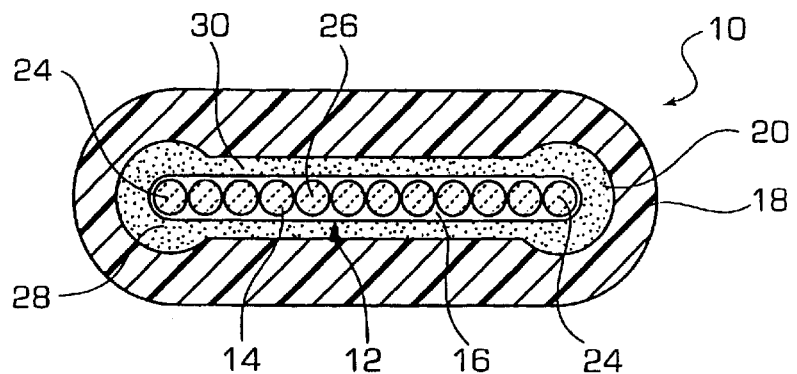
FIG. 2 is a schematic cross-section of an optical fiber ribbon cable according to a first embodiment of the present invention in which the space between the ribbon and the jacket has a dog-bone shape.

Referring to FIG. 2, like the convention cable discussed above, the optical fiber ribbon cable 10 includes one or more optical fiber ribbons 12 each including a plurality of optical fibers (usually twelve) 14 disposed in a plane and encapsulated with a polymer containing an ultraviolet curable resin 16. Surrounding the optical fiber ribbon(s) 12 is a plastic jacket 18 with an aramid yarn 20 (a strengthening filler), or the like, located in the space 22 between the ribbon 12 and the jacket 18.

The cable of the present invention differs from the convention cable in the following respect. As shown in FIG. 2, according to the present invention, the dimension of the space 22 is greater in the area of the edge fibers 24 than in the area of the interior fibers 26. For the purpose of clarity, the space between the edge of the ribbon 12 (where the edge fibers 24 are located) and the interior surface of the jacket 18 is referred to as a first space 28 and the space between the mid-portion of the ribbon 12 (where the remaining interior fibers 26 are located) and the interior surface of the jacket is referred to as the second space 30.

Figure 3:
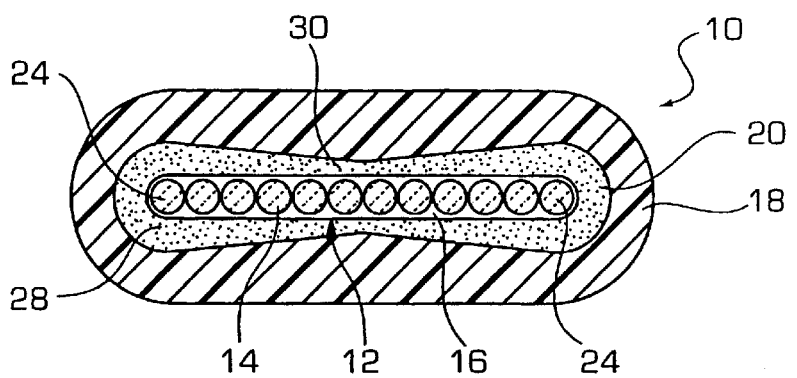
FIG. 3 is a schematic cross-section of an optical fiber ribbon cable according to a second embodiment of the present invention in which the space between the interior fibers and edge fibers increases in a liner manner from the center of the ribbon.
Figure 4:
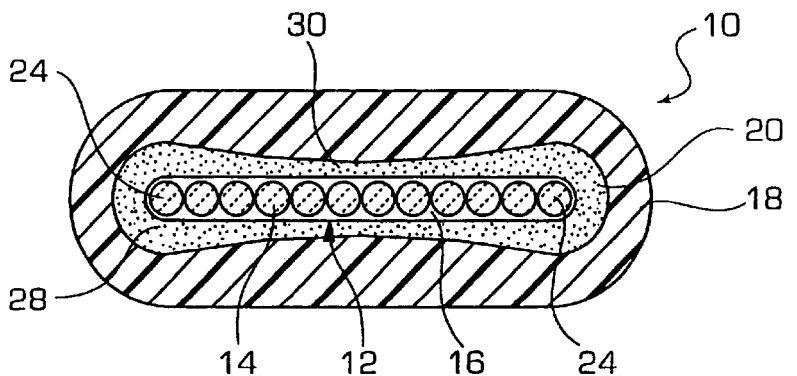
FIG. 4 is a schematic cross-section of an optical fiber ribbon cable according to a third embodiment of the present invention in which the space between the interior fibers and the edge fibers increases in a non-linear manner.
Figure 5:
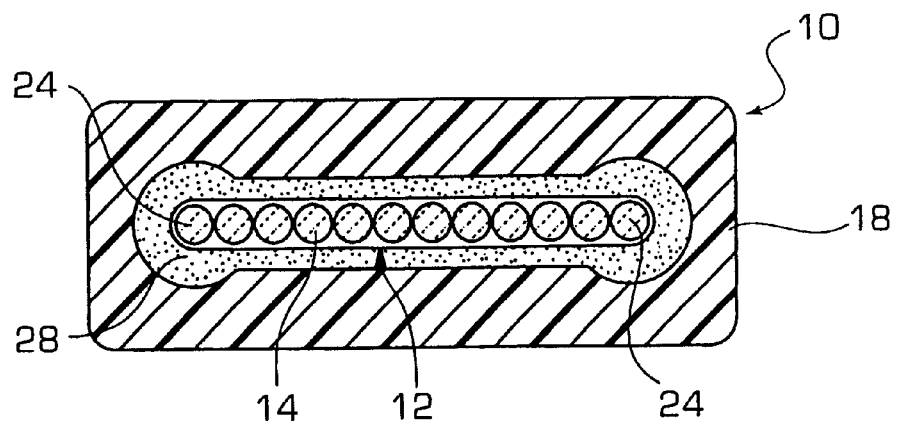
FIG. 5 is a schematic cross-section of an optical fiber ribbon cable according to the fourth embodiment of the present invention in which the jacket has a rectangular shape.

According to the invention, the width of the first space 28 is greater than the width of the second space 30. Further, according to the first embodiment, the space 22 (defined by the first space 28 and second space 30) has the shape of a dogbone. However, it is understood that the invention is not intended to be limited to this particular shape For example, as shown in FIGS. 3 and 4, the width of the first space 28 could gradually increase from the center of the ribbon toward the lateral edges of the ribbon in either a linear manner (FIG. 3) or exponentially (FIG. 4).

It has been discovered that the increased dimension associated with the second space 30 minimizes the stress experienced by the edge fibers 24 and that the attenuation in these fibers is correspondingly reduced. For example, the stress to which the optical fiber ribbon is subjected during the extrusion of the outerjacket had little or no adverse impact on the edge fibers.

The following tables (I and II) demonstrate the advantage of the present invention over the conventional optical fiber ribbon cable. In particular, an experiment was conducted comparing the attenuation in the conventional cable discussed above and illustrated in FIG. 1 with the attenuation in the cable of the present invention and illustrated in FIG. 2. Each of these cables was subjected to temperature cycling tests as outlined in the ANSI/EIA/TIA—455-3A:

| TEMPERATURE CYCLING 850 nm/1300 nm | |
|---|---|
| DATE 8-27-98 | CABLE IDENTIFICATION RDR012AB (Riser Ribbon Cable) |
| NUMBER OF TRANSMITTING FIBERS 12 | CABLE LENGTH 1,552 meters |
| TEST SPECIFICATION GR-409 | CONDITIONING TIME AND ENVIRONMENT 24 Hours at +22° C. |
| TEST EQUIPMENT TD-2000 OTDR/ TD-262 SL2 Module | |

TABLE I

The attenuation values in the following table are in dB/km.

| Cycle→ Fiber↓ | +25° C. Initial | −20° C. Δ Cycle 2 | +50° C. Δ Cycle 2 | 85° C. Δ | −20° C. Δ Cycle 4 | +50° C. Δ Cycle 4 | 25° C. Final Δ | 25° C. Final |
|---|---|---|---|---|---|---|---|---|
| Blue | 0.88/9.97 | Did not test | failed at | room temperature | | | | |
| Orange | 0.51/3.84 | | | | | | | |
| Green | 0.56/4.11 | | | | | | | |
| Brown | 0.56/2.04 | | | | | | | |
| Slate | 0.34/2.01 | | | | | | | |
| White | 0.45/0.53 | | | | | | | |
| Red | 0.42/0.40 | | | | | | | |
| Black | 0.42/0.61 | | | | | | | |
| Yellow | 0.42/0.92 | | | | | | | |
| Violet | 0.51/2.67 | | | | | | | |
| Rose | 0.52/5.70 | | | | | | | |
| Aqua | 1.15/10.32 | | | | | | | |

As shown in table I, the attenuation values of the optical fibers of the conventional scale were unacceptable at the initial temperature of 25° C. such that no further testing was performed. Typically, the fiber attenuation for this type of product should be less than 1.0 db/KM at both 1300 and 1550 nm. However, in the test, the attenuation values of one edge fiber 24 (i.e., the blue fiber) were 0.88 db/Km at 1300 nm and 9.97 db/Km at 1550 mm and the attenuation values of the other edge fiber (ite., the aqua fiber) were 1.15 db/Km at 1300 nm and 10.32 db/Km at 1550 nm. The attenuation values progressively decrease for the interior optical fibers 26 as you approach the center of the cable. It is believed that these poor attenuation values are the result of the cooling of the jacket during the extruding process.

Referring to Table II, below, the attenuation values for the optical fiber cable FIG. 2, according to the present invention, were dramatically improved.

| ITR-104 TEMPERATURE CYCLING 1300 nm/1550 nm | |
|---|---|
| DATE | 2-16-99 |
| CABLE IDENTIFICATION | 12 Fiber Ribbon 1C (057643) F.O. 97518 |
| NUMBER OF TRANSMITTING FIBERS | 12 |
| TOTAL FIBER LENGTH | 1700 meters |

-continued

ITR-104
TEMPERATURE CYCLING 1300 nm/1550 nm

| TEST SPECIFICATION | GR-409 |
|---|---|
| CONDITIONING TIME AND ENVIRONMENT | 24 Hours at +22° C. |
| TEST EQUIPMENT | OTDR TD-2000, OTDR Module TD-265 S |
| ENVIRONMENTAL CHAMBER | Thermotron SM-32C |
| TECHNICIAN | D. Rouse |

RESULTS TEST:
The attenuation values in the following table are in dB/km.

| Cycle→ Fiber↓ | +25° C. Initial | −20° C. Δ Cycle 2 | +50° C. Δ Cycle 2 | +85° C. Δ | −20° C. Δ Cycle 4 | +50° C. Δ Cycle 4 | −40° C. Δ | −60° C. Δ | 25° C. Final Δ | 25° C. Final |
|---|---|---|---|---|---|---|---|---|---|---|
| Blue | 0.37/0.25 | .01/.03 | .01/.05 | .01/.01 | .01/.00 | .01/.07 | .02/.02 | .07/.25 | .01/.01 | 0.36/0.24 |
| Orange | 0.38/0.26 | .00/.01 | .01/.00 | .03/.01 | .02/.00 | .02/.04 | .04/.02 | .01/.14 | .02/.04 | 0.40/0.30 |
| Green | 0.39/0.28 | .01/.03 | .01/.05 | .00/.02 | .01/.01 | .02/.00 | .01/.02 | .03/.18 | .00/.01 | 0.39/0.29 |
| Brown | 0.40/0.29 | .03/.06 | .01/.02 | .04/.04 | .01/.01 | .00/.02 | .03/.03 | .06/.39 | .05/.05 | 0.35/0.24 |
| Slate | 0.35/0.25 | .03/.05 | .00/.03 | .01/.00 | .00/.01 | .01/.01 | .01/.00 | .04/.12 | .04/.05 | 0.39/0.30 |
| White | 0.36/0.26 | .04/.12 | .01/.01 | .01/.02 | .00/.00 | .03/.02 | .02/.07 | .13/.37 | .01/.02 | 0.37/0.28 |
| Red | 0.40/0.29 | .01/.05 | .02/.04 | .01/.04 | .01/.01 | .02/.01 | .02/.02 | .06/.26 | .00/.03 | 0.41/0.32 |
| Black | 0.40/0.30 | .03/.03 | .01/.00 | .00/.01 | .03/.06 | .01/.01 | .01/.03 | .05/.32 | .00/.01 | 0.40/0.31 |
| Yellow | 0.39/0.27 | .00/.02 | .00/.01 | .00/.02 | .00/.00 | .01/.00 | .01/.01 | .02/.17 | .03/.02 | 0.36/0.25 |
| Violet | 0.38/0.27 | .01/.02 | .02/.04 | .02/.01 | .02/.01 | .01/.01 | .04/.02 | .02/.21 | .01/.01 | 0.37/0.26 |
| Rose | 0.37/0.26 | .01/.02 | .00/.01 | .01/.03 | .00/.00 | .03/.03 | .01/.00 | .04/.17 | .01/.02 | 0.36/0.24 |
| Aqua | 0.36/0.25 | .03/.06 | .02/.04 | .00/.00 | .00/.00 | .01/.05 | .02/.01 | .00/.27 | .02/.02 | 0.38/0.27 |

As can be seen from the above table II, the attenuation values for the blue edge fiber was 0.37 db/Km at 1300 nm and 0.25 db/Km at 1550 nm and the attenuation values for the aqua edge fiber were 0.36 db/Km at 1300 nm and 0.25 db/Km at 1550 nm. It is noted that the attenuation values were substantially uniform for each of the fibers (i.e., the attenuation values for the edge fibers 24 were approximately the same as for the interior fibers 26). Further, the attenuation values did not fluctuate substantially during the temperature cycling.

Figure 6:
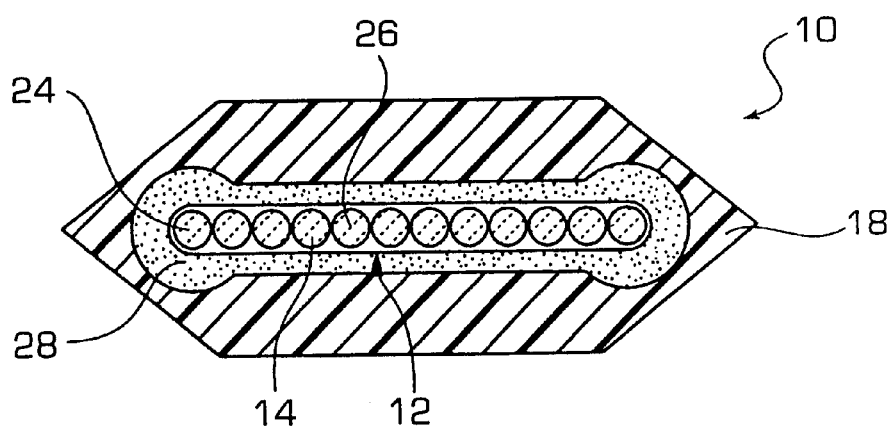
FIG. 6 is a schematic cross-section of an optical fiber ribbon cable according to a fifth embodiment of the present invention in which the jacket has a hexagonal shape.
Figure 7:
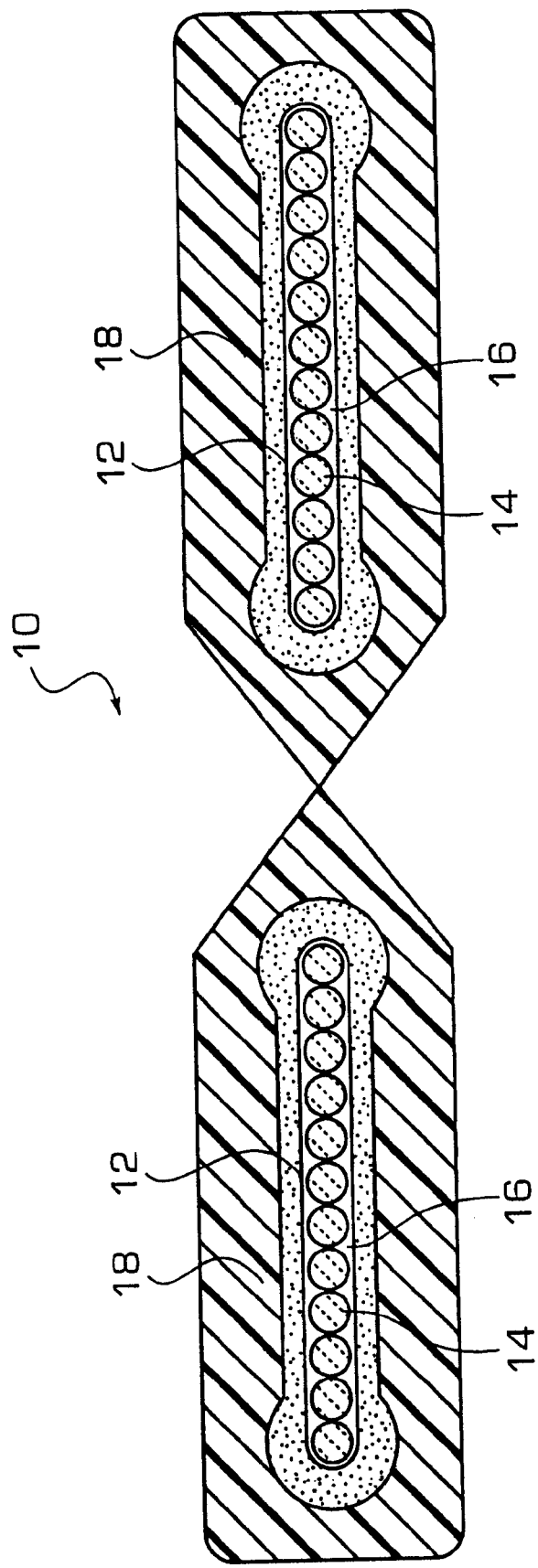
FIG. 7 is a schematic cross-section of an optical fiber ribbon cable according to a sixth embodiment of the present invention in which a pair of jackets are attached to each other in a side-by-side relationship.
Figure 8:
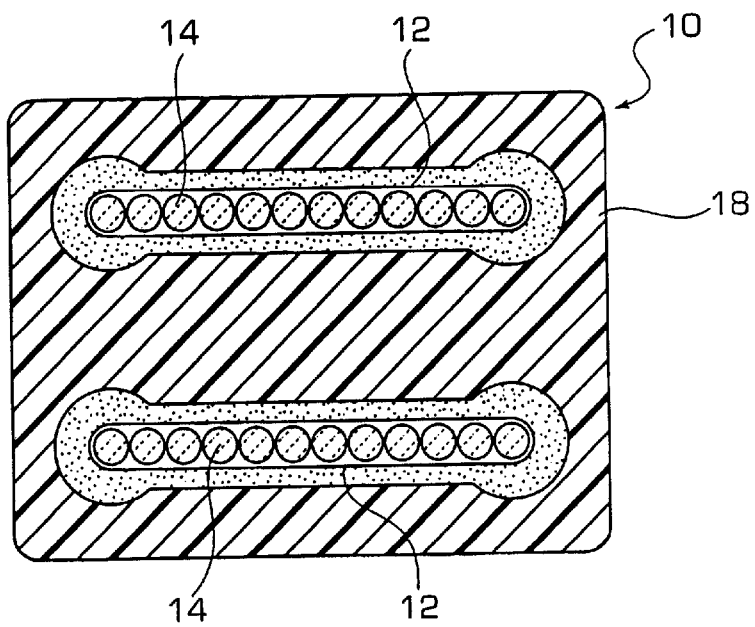
FIG. 8 is a schematic cross-section of an optical fiber ribbon cable according to a seven embodiment of the present invention in which a pair of jackets are attached to each other with one above the other.

Referring to FIGS. 2–6, the outside of the jacket may have various shapes including an oval shape (FIGS. 2–4), a rectangular shape (FIG. 5) and a hexagonal shape (FIG. 6). Further, as shown in FIGS. 7 and 8, the optical fiber cable may include two jackets 18 which a rejoined to each other such that the cable includes a pair of optical fiber ribbons 12. In FIG. 7, the jackets 18 are joined at the lateral sides so as to be oriented in a side-by-side relationship and in FIG. 8 the jackets 18 are disposed one on top of the other in a vertical relationship. Of course, it is understood that the invention is not limited to any particular shape of the jacket, nor to a specific number of jackets.

Figure 9A:
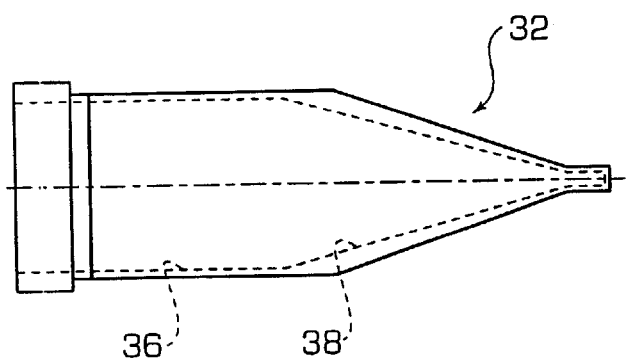
FIGS. 9(a) and (b) are side and end views, respectively, of the tip used for manufacture the optical fiber cable of the present invention.
Figure 10A:
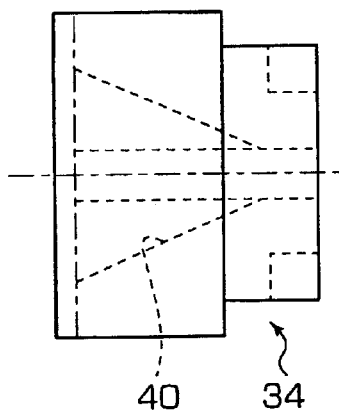
FIGS. 10(a) and (b) are side and end views, respectively, of the die used to manufacture the optical ribbon cable of the present invention.
Figure 10B:
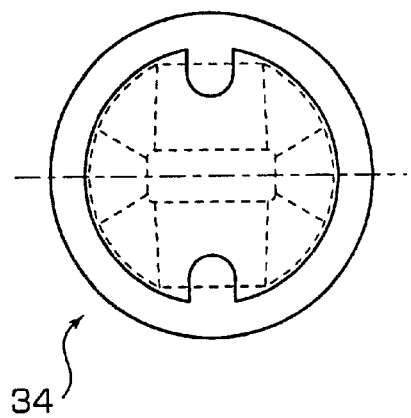

Manufacturing process steps and apparatus (not shown) used to manufacture the optical fiber ribbon cable 10 of the present invention are generally the same as used to make the prior art cables. The difference lies in the design of the die and tip used for extruding the jacket around the optical fiber ribbon. FIGS. 9(a) and (b) are side and end views, respectively, of the tip 32; FIGS. 10(a) and (b) are side and end views, respectively, of the die 34; and FIGS. 11(a) and (b) are side and end views, respectively, of the tip received inside the die.

Figure 9B:
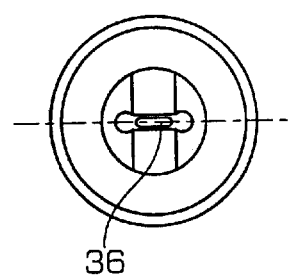
Figure 11A:
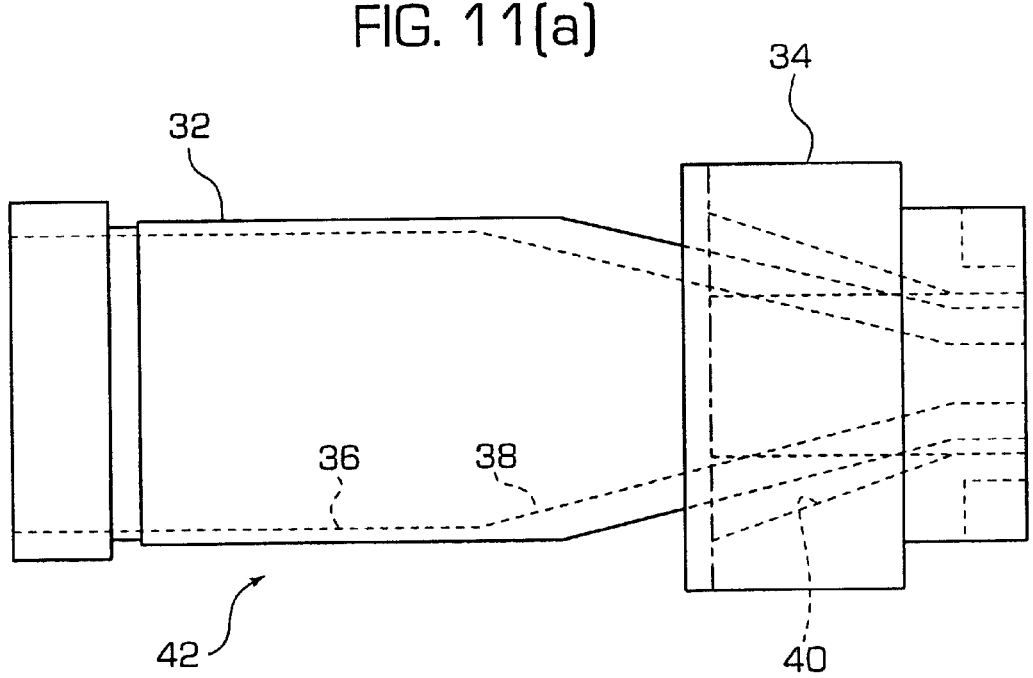
FIGS. 11(a) and (b) are side and end views, respectively, of the die and tip engaged with each other.
Figure 11B:
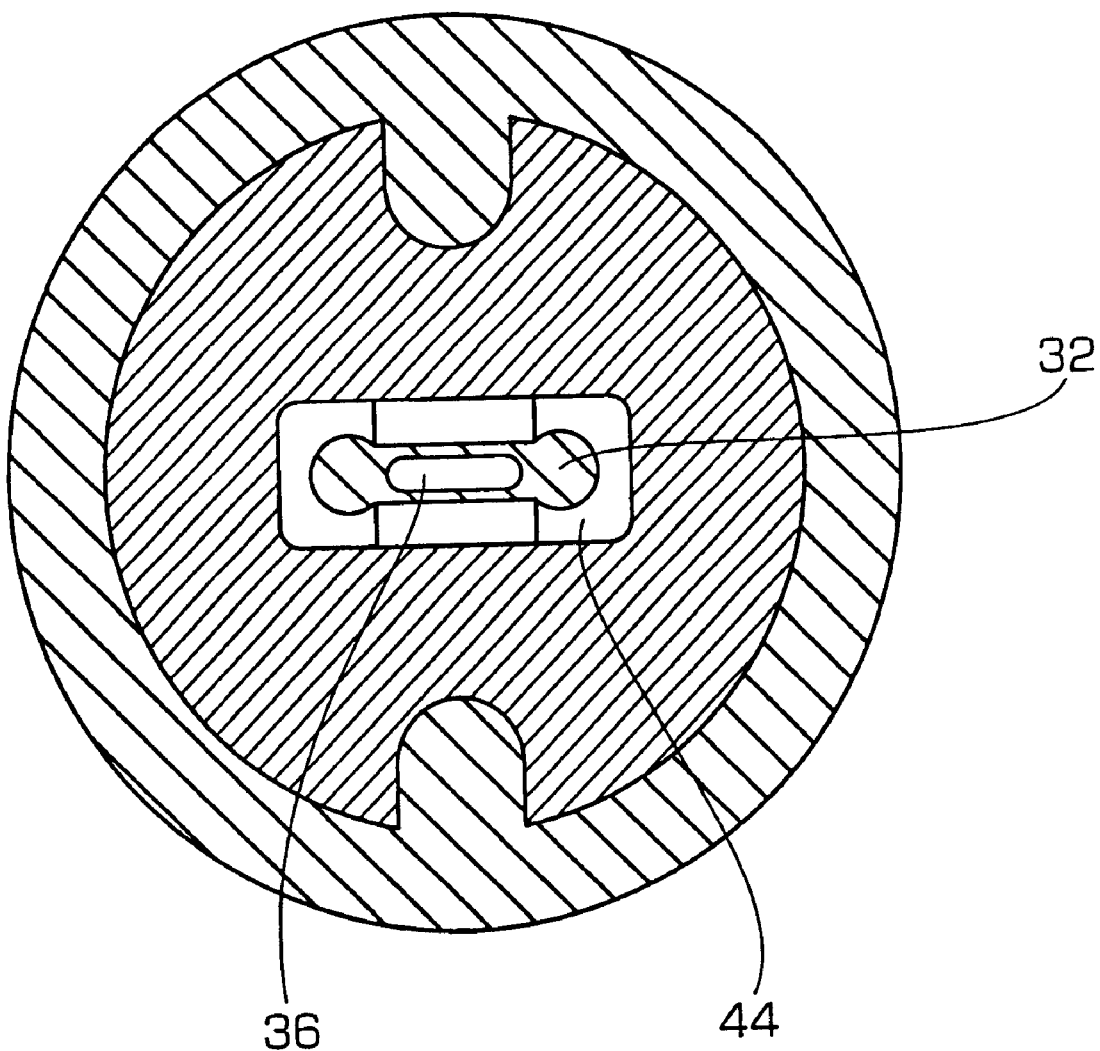

Referring to FIGS. 9(a) and (b), the tip 32 includes a longitudinal bore 36 for receiving the optical fiber ribbon 12 with the bore forming a conical portion 38 at the downstream side. As shown in FIG. 9(b), at the downstream end of the tip 32, the bore 36 has an oval shape and the outside profile of the tip 32 has the dog-bone shape. Referring to FIGS. 10(a) and (b), the die 34 also includes a longitudinal bore 40 for receiving the tip 32. With reference to FIGS. 11(a) and (b), when the tip 32 is received in the bore 40 of the die 34, the downstream end of the assembly 42 includes the oval-shaped bore 36 through which the ribbon 12 is conveyed, and an outer cavity 44 that is defined by the outer surface of the tip 32 and the inside surface of the bore 40 in the die 34 through which the molten plastic is extruded to form the jacket 18. Thus, the outside dog-shaped profile of the tip 32 forms the dog-boned shaped space 22 of the cable.

It is contemplated that numerous modifications may be made to the splittable optical fiber ribbons, dies, and processes, of the present invention without departing from the spirit and scope of the invention as defined in the following claims.

We claim:

1. An optical fiber ribbon cable, comprising:

an optical fiber ribbon having a plurality of optical fibers arranged in parallel including a pair of optical fibers respectively located on opposite edges of said ribbon and at least one optical fiber located between said pair of optical fibers;

an optical fiber jacket surrounding said ribbon and defining a first space between said jacket and each of said pair of ribbons and a second space, contiguous with said first space, between said jacket and said at least one optical fiber, wherein a width of said first space is greater than a width of said second space.

2. The optical fiber ribbon cable of claim 1, further comprising a strengthening filler disposed in said first and second spaces.

3. The optical fiber ribbon cable of claim 1, where said first and second spaces combine to have a dogbone shape.

4. The optical fiber ribbon cable of claim 1, wherein an internal surface of said jacket defining said first space has a curved shape.

5. The optical fiber ribbon cable of claim 1, wherein an exterior of said jacket has a rectangular shape.

6. The optical fiber ribbon cable of claim 1, wherein an exterior of said jacket has an oval-like shape.

7. An optical fiber ribbon cable of claim 1, wherein an exterior of said jacket has six sides.

8. An optical fiber ribbon cable of claim 1, further comprising a second optical fiber ribbon and a second jacket enclosing said second optical fiber ribbon and having said first and second spaces therebetween.

9. The optical fiber ribbon cable of claim 8, wherein said second jacket is joined to said jacket.

10. The optical fiber ribbon cable of claim 9, wherein said second optical fiber ribbon and said optical fiber ribbon are laterally spaced from each other.

11. The optical fiber ribbon cable of claim 9, where said second optical fiber ribbon is stacked vertically above said optical fiber ribbon.

12. The optical fiber ribbon cable of claim 1, wherein the width of said second space gradually increases from a center of said optical fiber ribbon toward said opposite edges.

13. The optical fiber ribbon of claim 12, wherein said width increases in a linear manner.

14. The optical fiber ribbon of claim 12, where said width increases non-linearly.

* * * * *